Aug. 20, 1957  A. A. BERNARD ET AL  2,803,208
ADJUSTABLE WELDING CLAMPS
Filed July 2, 1949  2 Sheets-Sheet 1
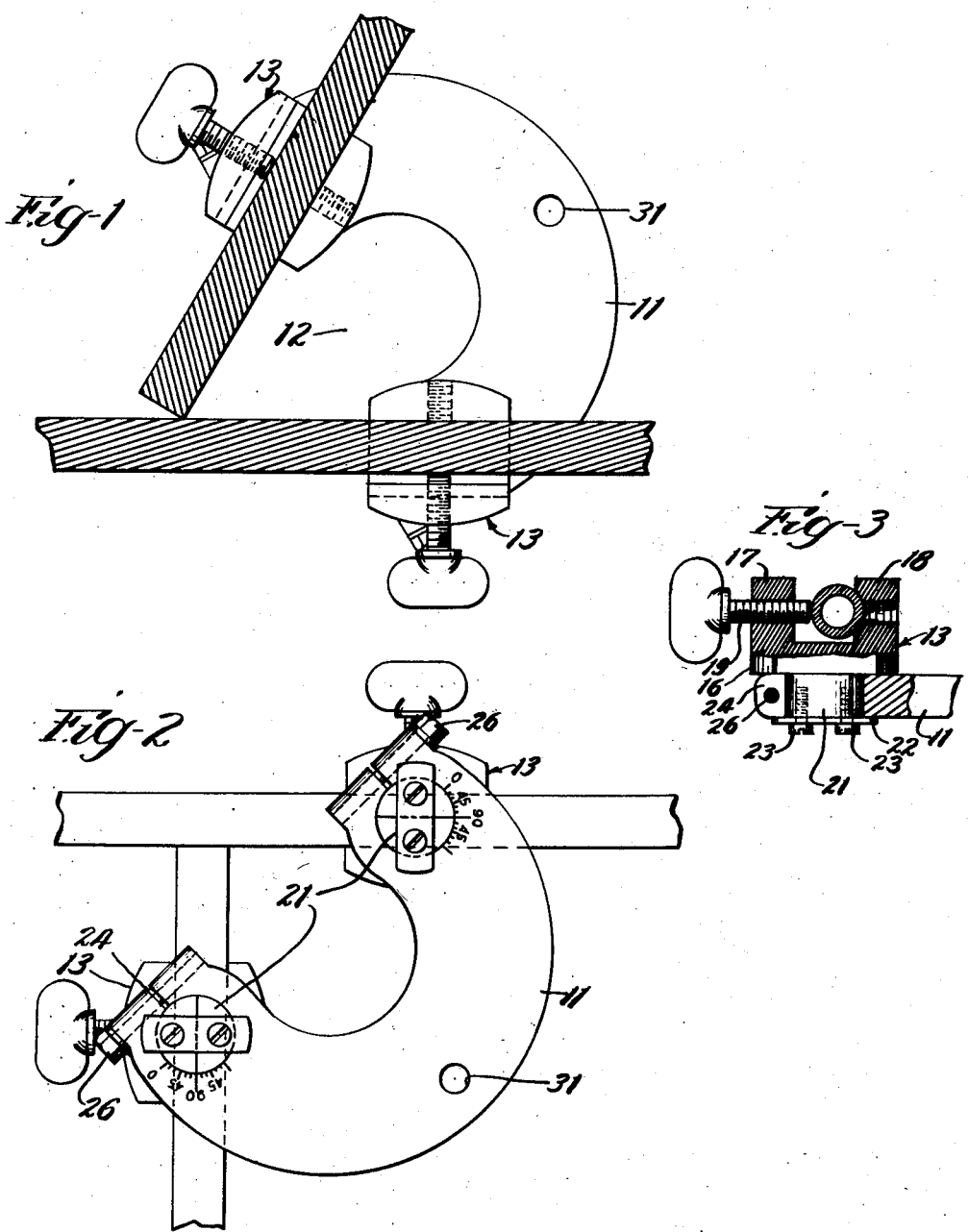
Inventors
Arthur A. Bernard,
Richard A. Bernard.
By:- Louis Robertson Atty.

Aug. 20, 1957 A. A. BERNARD ET AL 2,803,208
ADJUSTABLE WELDING CLAMPS
Filed July 2, 1949 2 Sheets-Sheet 2
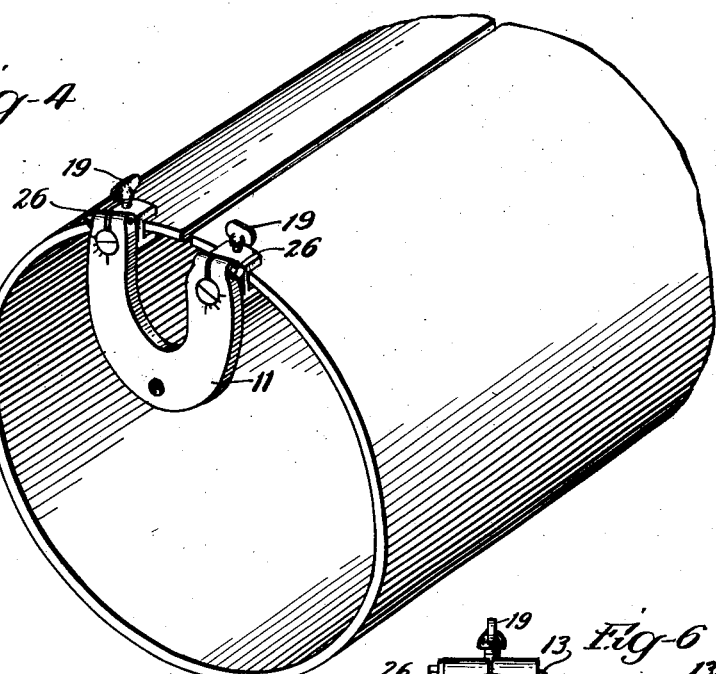
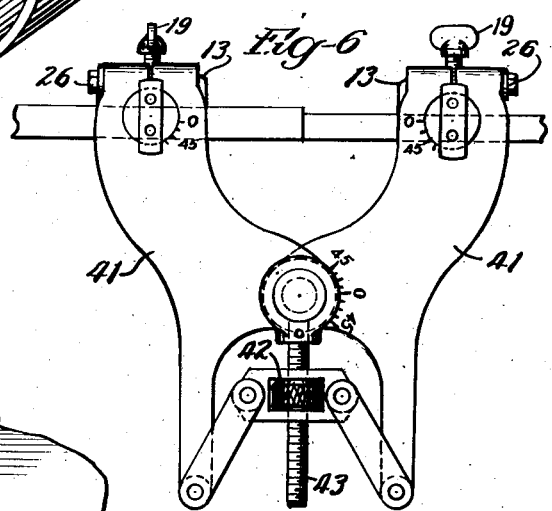
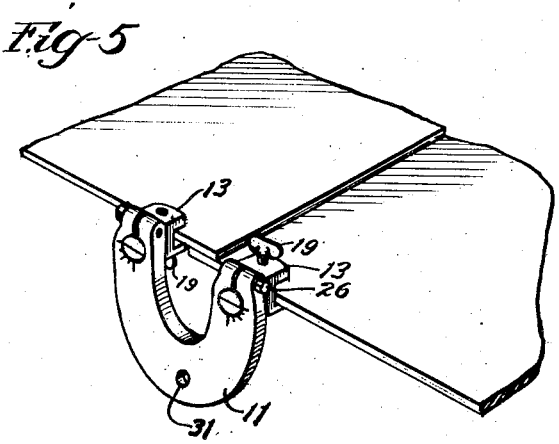
Inventors
Arthur A. Bernard+
Richard A. Bernard
By:- Louis Robertson Atty.

2,803,208
Patented Aug. 20, 1957

2,803,208
ADJUSTABLE WELDING CLAMPS

Arthur A. Bernard and Richard A. Bernard, Chicago, Ill.

Application July 2, 1949, Serial No. 102,908

7 Claims. (Cl. 113—99)

In welding two pieces together it is desirable that they be preliminarily held in a reliable manner, accurately positioned in the relative positions to which they are to be welded. Sometimes this has been done by preliminary tack welding but holding the pieces in proper positions with clamps is much preferred. There has in the past been a variety of clamps for welding. Some of them have been adjustable with respect to the angularity at which they held the pieces but these have not been universally satisfactory. One of the most common faults has been that the change in angularity was accompanied by a change in the spacing of the clamp members. This would sometimes complicate the proper positioning of the pieces to be welded and would often make use of the clamp for small pieces impossible.

According to the present invention a very much more satisfactory adjustable welding clamp is provided by separately pivoting the clamp portions so that the angularity of the work pieces can be changed without changing the spacing of the clamps. Independently of the foregoing adjustment, there may be an adjustment for the spacing of the clamp pieces so that after the work is clamped in them the two pieces may be easily and accurately moved with respect to one another to provide the proper weld spacing.

Preferably each clamp piece is provided with calibrations so that the two clamp pieces may easily be set to a desired angularity. Also the clamp pieces are preferably provided with one flat surface jaw and one V-jaw, the clamping screw being adapted to cooperate with either jaw, to hold a pipe or rod against one jaw, or a flat bar or plate against the other jaw.

Additional objects and advantages of the invention will be apparent from the following description and from the drawings, in which:

Figure 1 is a view of the working or inner side of one type of clamp chosen for illustration of this invention showing it holding two plates (shown in section) at an angle to one another.

Fig. 2 is a view showing the back or outer side of the structure shown in Fig. 1 with the clamp units adjusted for ninety degree angularity.

Fig. 3 is a fragmentary cross-sectional view showing particularly the construction and mounting of a clamp unit, the screw thereof being arranged for clamping pipe.

Figs. 4 and 5 are fragmentary perspective views showing uses of the clamp of Figs. 1 to 3.

Fig. 6 is a view somewhat corresponding to Fig. 2 but showing a modified form of the invention in which the spacing of the clamp units is adjustable.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements or combinations in which the inventive concepts are found.

In the form of the invention shown in Figs. 1 to 5 the clamp includes a yoke 11 forming a gap 12 at opposite sides of which are clamp units 13 each carried by the yoke 11.

As seen best in Fig. 3, each clamp unit 13 includes a clamp block 16 having spaced fixed jaws 17 and 18. A screw 19, preferably a thumb screw, is shown threaded through jaw 17 to press work against the jaw 18. The jaw 18 is provided with a face which is of V-shape in cross-section in the plane shown to receive a pipe when a pipe is to be welded. The V-shaped groove runs longitudinally of the jaw 18, extending the full length of the jaw, so that the pipe may rest in the V-groove while extending through the clamp unit 13 in the channel formed by the two jaws 17 and 18. Alternatively, the screw 19 may be withdrawn from jaw 17 and threaded through a hole provided in jaw 18 to press a flat work piece, such as a bar or plate, against jaw 17.

Block 16 is provided with an integral extension 21 forming a trunnion for mounting the clamp unit 13 rotatably in yoke 11. Axial movement of the clamp piece may be restrained by a retaining bar 22 secured to trunnion 21 by screws 23. Of course screws 23 may be countersunk and may be provided with Phillips heads.

As seen best in Fig. 2, yoke 11 is provided with a slot 24 converting the end of the yoke into a split bushing, so that the trunnion 21 may be firmly gripped by tightening a screw 26. Thus the clamp unit 13 may be locked in any angularity to which it is set.

In many instances the clamp units 13 may be set to a predetermined angularity prior to clamping the work pieces therein. To aid in this presetting, calibrations may be provided on yoke 11 adjacent each of trunnions 21, as clearly seen in Fig. 2. Of course the trunnion 21 must be provided with a reference mark. Conveniently there may be a diametric line across the back of trunnion 21 parallel with the faces of jaws 17 and 18 so that the two ends of the diametric line provide reference marks, either one of which may be used adjacent the scale or calibrations on yoke 11. Hence one end or the other of the diametric mark will be adjacent the scale for most types of clamping, depending only on which way around it is most convenient to use the clamp block 13.

In presetting the angularity, the two clamp units 13 will usually be turned to the same angularity and the calibrations preferably indicate the angularity between the two clamp units, not that between one clamp unit and the yoke. Thus as seen in Fig. 2, the clamp units have been set to a ninety degree indication and as a result they reliably hold the work pieces at ninety degrees with respect to one another. After presetting the clamping units 13 to the ninety degree indications, screws 26 are tightened to lock the clamp units in this position and thereafter the work is placed in one or more such clamps and the individual clamp units tightened on the work.

In handling plates or other large objects there will usually be at least two clamps, each having two clamp units 13, the two clamps holding the two pieces to be welded at opposite ends of the weld line. Of course in some instances a good many more clamps will be used to hold a number of pieces together in their ultimate assembled positions so that a large structure, or a large section of a structure, will be completed by making a number of welds simultaneously or in quick sequence. This procedure is very advantageous in making sure that a number of small pieces are properly positioned relative to one another to provide the necessary outside dimensions for fitting in a given location.

In some types of work it will be more convenient not to preset the angularity of the clamp units 13 but to loosen screws 26 so that the clamp units 13 may adjust themselves to the work. Thus if a cylinder or pipe is to be welded along a longitudinal line as seen in Fig. 4, the angularity of the clamps will be adjusted to that of the work. Usually the two edges to be welded together will have been spaced properly before the clamp is applied. The clamp will then be applied, the operator tightening both the screws 26 and the screws 19. Thereafter any temporary means used for holding the edges properly spaced, such as a wire around the pipe, may be removed. Minor correction in the spacing of the edges can easily be made upon loosening one screw 19 without loosening the screws 26.

If it should be desired to use the clamps of this invention for welding sheets together in an overlap arrangement as seen in Fig. 5, this can be done by clamping each sheet in one of the clamp units 13 and then, with the screws 26 loose, shifting the plates until they assume the desired flat contact along the overlapping area.

The yoke 11 has been illustrated with a hole 31 through it, such a hole sometimes being useful in supporting the work during welding.

Although the clamp units 13 have been illustrated as pivoted about axes perpendicular to the planes of the faces of yoke 11, it will be apparent that they could be pivoted about other axes if desired. They could, for example, be pivoted about parallel axes parallel to the faces of yoke 11 either extending out from the ends of the yoke approximately in the plane thereof, or by providing the yokes with angularly disposed extensions into which the clamp units 13 are pivoted. The clamps could in fact be pivoted into extensions which are themselves pivoted so as to give a universal action. A universal mounting of one of the two clamp units 13 would often be sufficient. A universally mounted clamp unit could also be provided by a single ball and socket mounting of the clamp unit in place of the two separate pivots. Universal mounting might be useful, for example, in welding a pipe or rod at an acute angle to a plate with no common plane coinciding with the rod and any edge of the plate.

Although the discussion so far has assumed that the yoke 11 is in one piece, except for the swivel mounting above mentioned, it could be in two pieces pivoted together at a mid point as indicated in Fig. 6. The pivotal arrangements may be the same as have been used on pivoted clamps heretofore and hence need not be described in detail. However, because of the pivotal mounting of the individual clamp units 13 at each yoke end, the pivoting between the two yoke halves 41 and will usually be used only for the purpose of adjusting the two edges of the work to be welded with respect to one another. Accordingly it is preferred that some screw device be provided for adjusting the two yoke halves with respect to one another. Preferably the screw device should operate in both directions either by direct screwing action or by spring biasing. In the form diagrammatically represented in Fig. 6, the knurled nut 42 may be turned in either direction to screw either way on threaded stud 43 and thus pivot the yoke halves 41 with respect to each other in either direction. Calibrations may be provided between the two yoke halves as between the two halves of prior art pivoted clamps. There should at least be a zero indication to show the setting of the two yoke halves 41 at which the calibrations of the clamp units 13 will be accurate.

Although any suitable materials may be used for the clamp, lightness for a given strength has some advantages and hence the alloy known as "Almag" is at present preferred.

From the foregoing it is seen that a clamp is provided with a very wide variety of uses and which will be satisfactory under conditions for which prior clamps were not satisfactory. Furthermore, the clamp is reasonably inexpensive in construction and is sufficiently rugged to give dependable service for years.

We claim:

1. A welding clamp including a unitary gap-forming yoke terminating in end portions on opposite sides of the gap formed thereby, a clamp piece carried by each end portion of the yoke, said clamp pieces being pivoted about fixed parallel axes and each clamp unit being channeled in a position offset from the legs in a direction parallel to said axes to hold a work piece which extends through the clamp any distance in any direction approximately perpendicular to the pivotal axis thereof, and calibrations associated with each clamp unit indicating the angularity of a work piece held by one clamp unit to a work piece held by the other when both clamp units are set at corresponding calibrations.

2. A welding clamp including a unitary gap-forming yoke terminating in end portions on opposite sides of the gap formed thereby, a clamp piece carried by each end portion of the yoke, said clamp pieces being pivoted about fixed parallel axes and each clamp unit being channeled in a position offset from the legs in a direction parallel to said axes to hold a work piece which extends through the clamp any distance in any direction approximately perpendicular to the pivotal axis thereof, and calibrations associated with each clamp unit indicating the angularity of a work piece held by one clamp unit to a work piece held by the other when both clamp units are set at corresponding calibrations, and means for locking the clamp units against pivotal movement.

3. A welding clamp including a gap-forming yoke having two end portions on opposite sides of the gap formed thereby and clamp units pivoted to said end portions about axes parallel to one another and perpendicular to the plane of the yoke, calibrations on each end portion adjacent each clamp unit, diametrically disposed reference markings on each clamp piece adapted to cooperate with the calibrations at one end of the diameter when the clamp unit is turned in one direction and at the other end of the diameter when the clamp unit is reversed, each clamp unit having a work-receiving passage through the unit in a direction perpendicular to the pivotal axis and defined by generally oppositely disposed clamping surfaces each formed by a clamping member having a threaded hole through it and through said surface thereon, one of said clamping surfaces being flat and the other being V-shaped in cross-section, and a screw adapted to screw optionally through either clamp surface to clamp the work against the other.

4. A welding clamp including a gap-forming yoke having two end portions on opposite sides of the gap formed thereby and clamp units pivoted to said end portions about axes parallel to one another, calibrations on each end portion adjacent each clamp unit, diametrically disposed reference markings on each clamp piece adapted to cooperate with the calibrations at one end of the diameter when the clamp unit is turned in one direction and at the other end of the diameter when the clamp unit is reversed, each clamp unit having a work-receiving passage through the unit in a direction perpendicular to the pivotal axis and defined by generally oppositely disposed clamping surfaces each formed by a clamping member having a threaded hole through it and through said surface thereon, one of said clamping surfaces being flat and the other being V-shaped in cross-section, and a screw adapted to screw optionally through either clamp surface to clamp the work against the other.

5. A welding clamp including a gap-forming yoke having two end portions on opposite sides of the gap formed thereby and clamp units pivoted to said end portions about axes parallel to one another, each clamp unit having a work-receiving passage through the unit in a direction perpendicular to the pivotal axis and defined by generally oppositely disposed clamping surfaces each formed by a clamping member having a threaded hole through it and through said surface thereon, one of said clamping surfaces being flat and the other being V-shaped in cross-section, and a screw adapted to screw optionally through either clamp surface to clamp the work against the other.

6. A clamp unit having a work-receiving passage therethrough defined by generally oppositely disposed clamping surfaces each formed by a clamping member having a threaded hole through it and through said surface thereon, one of said clamping surfaces being flat and the other being V-shaped in cross-section, and a screw adapted to screw optionally through either clamp surface to clamp the work against the other, the clamping end of said screw being free from enlargements which would restrict its withdrawal beyond the surface through which it is screwed.

7. A welding clamp including a gap-forming yoke having two unitary legs extending from a common point and terminating in end portions on opposite sides of the gap formed thereby, each end portion including a split bushing having an axis parallel to the axis through said gap and adapted to receive a trunnion, means for tightening the bushings on trunnions therein, a clamp block associated with each end portion, each clamp block having a clamping head and a reduced portion extending axially from the head forming a trunnion in the associated split bushing, clamping means associated with each clamp block for holding a work piece against a clamping surface of the clamp block, and calibration means associated with each trunnion and its bushing for indicating by direct reading the angularity between said clamping surfaces of the two clamp blocks when the calibrations indicate like settings.

References Cited in the file of this patent

UNITED STATES PATENTS

| | | |
|---|---|---|
| 57,447 | Stockmar | Aug. 21, 1866 |
| 85,372 | Elliott | Dec. 29, 1868 |
| 265,549 | Urie | Oct. 3, 1882 |
| 307,248 | Winegar | Oct. 28, 1884 |
| 324,276 | Scribner | Aug. 11, 1885 |
| 402,108 | Ries | Apr. 23, 1889 |
| 809,432 | Darrschmidt | Jan. 9, 1906 |
| 1,118,327 | Bucknam | Nov. 24, 1914 |
| 1,306,858 | Salter | July 17, 1919 |
| 1,323,127 | Treuthardt | Nov. 25, 1919 |
| 1,476,611 | Hines | Dec. 4, 1923 |
| 1,551,342 | Steenstrup | Aug. 25, 1925 |
| 1,585,490 | Hainsworth | May 18, 1926 |
| 1,674,330 | Hyler | June 19, 1928 |
| 1,865,916 | Jolley | July 5, 1932 |
| 1,875,761 | Power | Sept. 6, 1932 |
| 2,175,974 | Shurtz | Oct. 10, 1939 |
| 2,369,425 | Becker | Feb. 13, 1945 |
| 2,383,170 | Stoll | Aug. 21, 1945 |
| 2,396,452 | Widmark | Mar. 12, 1946 |
| 2,423,434 | Beaupre | July 8, 1947 |
| 2,460,701 | Marshall | Feb. 1, 1949 |

FOREIGN PATENTS

| | | |
|---|---|---|
| 151,351 | Great Britain | Sept. 21, 1920 |